United States Patent
Adiseshan

(10) Patent No.: US 7,421,306 B2
(45) Date of Patent: Sep. 2, 2008

(54) APPAREL SIZE SERVICE

(75) Inventor: Kaushie Adiseshan, Palo Alto, CA (US)

(73) Assignee: Sanghati, LLC, Palo Alto, CA (US)

( * ) Notice: Subject to any disclaimer, the term of this patent is extended or adjusted under 35 U.S.C. 154(b) by 123 days.

(21) Appl. No.: 11/229,034

(22) Filed: Sep. 15, 2005

(65) Prior Publication Data

US 2006/0059054 A1    Mar. 16, 2006

Related U.S. Application Data

(60) Provisional application No. 60/611,058, filed on Sep. 16, 2004.

(51) Int. Cl.
*G06F 19/00* (2006.01)

(52) U.S. Cl. ......................... 700/130; 705/26

(58) Field of Classification Search ............... 700/130, 700/131, 132; 705/26, 27; 703/2; 345/419, 345/420, 630; 382/111
See application file for complete search history.

(56) References Cited

U.S. PATENT DOCUMENTS

| | | | | |
|---|---|---|---|---|
| 5,768,135 A * | 6/1998 | Park et al. | | 700/130 |
| 5,930,769 A * | 7/1999 | Rose | | 705/27 |
| 6,307,568 B1 * | 10/2001 | Rom | | 345/629 |
| 6,311,403 B1 * | 11/2001 | Macrini | | 33/1 SD |
| 6,353,770 B1 * | 3/2002 | Ramsey et al. | | 700/131 |
| 6,516,240 B2 * | 2/2003 | Ramsey et al. | | 700/131 |
| 6,546,309 B1 * | 4/2003 | Gazzuolo | | 700/132 |
| 6,665,577 B2 * | 12/2003 | Onyshkevych et al. | | 700/130 |
| 6,701,207 B1 * | 3/2004 | Gazzuolo | | 700/132 |
| 6,901,379 B1 * | 5/2005 | Balter et al. | | 705/27 |
| 7,020,538 B2 * | 3/2006 | Luhnow | | 700/132 |
| 7,092,782 B2 * | 8/2006 | Lee | | 700/132 |
| 2002/0004763 A1 * | 1/2002 | Lam | | 705/26 |
| 2002/0138170 A1 * | 9/2002 | Onyshkevych et al. | | 700/130 |
| 2002/0188372 A1 * | 12/2002 | Lane et al. | | 700/130 |
| 2004/0078285 A1 * | 4/2004 | Bijvoet | | 705/26 |
| 2004/0083142 A1 * | 4/2004 | Kozzinn | | 705/27 |
| 2005/0080505 A1 * | 4/2005 | Luhnow | | 700/132 |
| 2006/0015208 A1 * | 1/2006 | Reyes Moreno | | 700/132 |
| 2006/0080182 A1 * | 4/2006 | Thompson et al. | | 705/26 |
| 2006/0195219 A1 * | 8/2006 | Luhnow et al. | | 700/132 |

* cited by examiner

*Primary Examiner*—Gary L. Welch
*Assistant Examiner*—Nathan E Durham
(74) *Attorney, Agent, or Firm*—Schwabe Williamson & Wyatt, P.C.

(57) ABSTRACT

Embodiments of the present invention provide an apparel size service to provide a customer or user with an apparel size recommendation, for example, by providing information about an appropriate size of apparel for an individual based on comparison information with other apparel, comparison with characteristics of other individuals, and/or comparison with profile and/or history data of the individual.

34 Claims, 4 Drawing Sheets

240

APPAREL SIZE SERVICE

CROSS REFERENCE TO RELATED APPLICATIONS

The present application claims priority to U.S. Provisional Patent Application No. 60/611,058, filed Sep. 16, 2004, entitled "Apparel Size Service," the entire contents and disclosure of which is hereby incorporated by reference in its entirety.

TECHNICAL FIELD

Embodiments of the present invention relate to the field of data processing, more specifically, to a computer implemented apparel size service (hereinafter, simply apparel size service).

BACKGROUND

One of the biggest stumbling blocks to selling apparel, especially online sales, such as over the Internet, is the matter of sizing. Today, there is no standard for apparel sizes, and the same person fits into different sizes for different apparel and/or at different retailers. This problem makes it very difficult to order apparel, such as clothing, especially when making a purchase online, unless the customer is sure of the fit (e.g., repeat orders). Even when a customer visits a bricks-and-mortar store, it is often not clear which sizes to try on, for different styles.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide an apparel size service to provide a customer or user with information about an appropriate size of apparel for an individual based on comparison information with other apparel and/or profile/history data of the individual.

Embodiments of the present invention include, but are not limited to, an apparel size service, hardware and/or software components implementing or contributing to the implementation of an apparel size service in full or in part, apparatuses and systems having such an apparel size service, and/or related hardware/software components.

Figure 1:
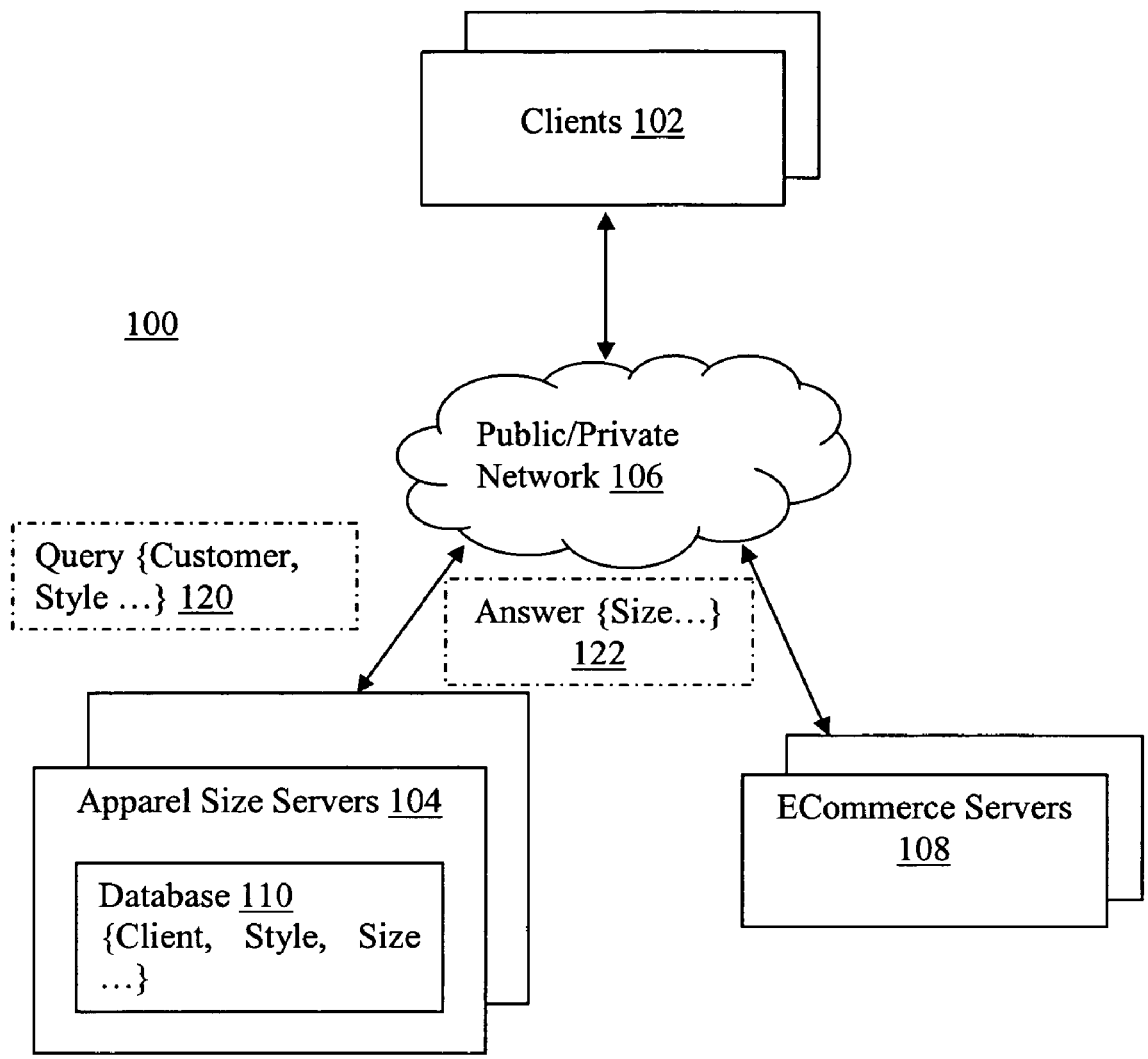
FIG. 1 illustrates a computing environment suitable to practice an apparel size service in accordance with various embodiments of the present invention.

FIG. 1 illustrates a computing environment suitable for practicing an apparel size service in accordance with various embodiments of the present invention. As illustrated, computing environment 100 includes client devices (or simply, clients) 102 coupled to apparel size service server 104 and ecommerce server 108 via public and/or private network 106. Apparel size service server 104 is adapted to service apparel size recommendation request 120 from users of clients 102, allowing users to request a size recommendation for purchasing an apparel, e.g., with ecommerce server 108. For embodiments of the present invention, the term "apparel" may be broadly defined to include any type of clothing and related objects that are typically offered in multiple sizes, including but not limited to dresses, shirts, jackets, pants, sweaters, coats, socks, shoes, belts, hats, gloves, and so forth. Additionally, public and/or private network 106 may be wire line and/or wireless based, in part or in whole; and communication between client 102, apparel size server 104 and ecommerce server 108 may be conducted in accordance with any of a number of communication and/or messaging protocols.

For the embodiment illustrated in FIG. 1, a request 120 may be in the form of a query, e.g., Query {Customer, Style . . . }, that is providing an identification/description of the customer, and an identification/description of the style of the apparel. A recommendation may be returned, e.g., in the form of an answer, such as Answer {Size . . . } (122). Examples of size include, but are not limited to, 2, 8, 36×32, medium, and so forth.

In an embodiment of the present invention, a customer may register with an apparel size service to establish a profile and/or to develop a specific customer history. A customer may also be referred to as a user, or a user may be someone other than the particular customer, such as a sales agent. The profile may be used to store relevant data such as height, weight, waist measurements, etc. The history may be used to store style and size of various purchases of the user.

In an alternate embodiment of the present invention, in lieu of pre-establishing a profile and/or history, a customer may provide relevant information in conjunction with a specified query. For example, in a query for a size recommendation for style X, a system of the present invention may prompt the customer to provide information, for example, about their height or weight, or may prompt the customer to provide information about other styles, such as another style for which the customer knows their size.

In alternate embodiments, multiple answers qualified with a likelihood of correctness may be returned instead in a form of Answer {Size, Probability ... } (122).

In various embodiments of the present invention, alternate and/or additional parameters may be provided as part of Query 120. Similarly, additional information, e.g. a store suggestion, possibly including the location and/or contact information of a store may be included as part of Answer 122.

As illustrated for the embodiments of FIG. 1, apparel size service server 104 includes one or more databases 110 having stored therein a number of records {Customer, Style, Size ... }. For various embodiments of the present invention, the term "customers" refers to people who purchase or have interest in purchasing apparel, e.g. clothing. In accordance with embodiments of the present invention, identification information may include, but is not limited to, an identifier, a name, age, gender, height, weight, and so forth. For various embodiments of the present invention, the term "style" refers to a specific product by its attributes including, but not limited to, the brand, style name, gender it applies to (men's or women's), available sizes, available colors, and so on, e.g., "Gap Emerson-fit flat-front khakis" or "Diesel Kratt jeans."

In embodiments of the present invention, databases 110 may be populated with information regarding various styles and the sizes associated with those styles. In addition, such databases may contain information that relates various styles to each other to determine an appropriate size from one style to another style. Databases may be populated with information from customers, retailers, manufacturers, etc., and may be modified or updated dynamically to ensure that the information accurately reflects current styles from various designers.

As described earlier, in various embodiments of the present invention, an apparel size service may operate independently or in conjunction with another service, such as an ecommerce retailer. Databases as discussed above may be linked to an online retailer or as part of the apparel size service and may utilize information derived from a customer's purchasing patterns, for example from online purchasing or via credit card transactions, to dynamically update the customer's historical purchasing data.

In an embodiment of the present invention, a user may query an apparel size server for a recommendation for an appropriate size/style of apparel based on information the user possesses. For example, the user/customer may be aware that a particular size/style in Brand A fits well, and thus would like to know the corresponding size or style in Brand Y. Thus, an apparel size server of the present invention may provide a simple translation between styles, sizes and/or brands.

In various embodiments of the present invention, an apparel size service may generate an Answer 122 based on a transitivity property of sizes across styles. To illustrate, if many customers who wear a size 4 in style A, wear a size 5 in style B, and many customers who wear a size 5 in style B wear a size 3 in style C, then it is likely that a customer, who wears a size 4 in style A, wears a size 3 in style C.

In various embodiments of the present invention, the most likely Answer 122 may be returned. In other embodiments of the present invention, an Answer 122 may be returned with a likelihood of correctness identified. For example, of the 100 customers who wear a size 4 in style A and who also wear style B, 80 customers wear size 5 in style B, while 20 customers wear other sizes (e.g., size 4 or 6) in style B, for whatever reasons. In such a case, an apparel size service may return an Answer 122 indicating that if a user wears a size 4 in style A, the same user may wear a size 5 in style B with a probability of 0.8, or shown as a percentage of accuracy of 80%.

In still other embodiments of the present invention, a range of Answers 122 qualified with a corresponding likelihood of correctness may be returned.

An apparel size service in accordance with embodiments of the present invention may return Answers 122 based at least in part on an affinity property, which further takes into consideration the purchasing history H(A) of customer A. For example, consider a query (A, X), i.e., customer A, style X, and the apparel size service has access to customer A's purchasing history H(A)—which may be maintained, for example, as a set of triples {Customer, Style, Size} in the database where customer A's name appears. Suppose further that style X is available in k sizes, S1, ..., Sk. The objective is to assign a score to each size Si, i=1, ..., k, which measures the likelihood that a customer with purchasing history H(A) wears size Si.

In various embodiments of the present invention, each affinity score may be computed as the sum of the path scores, one score for each path connecting the two nodes. A path score may be defined as the minimum score of the edge or edges along the path. In alternate embodiments of the present invention, other mathematical functions, besides the "sum {minimum (score)}" approach, may be used to combine the edge scores along the paths connecting the two nodes (including, but not limited to, product, maximum, second largest, some factor times the smallest weight, and so forth).

Figure 2A:
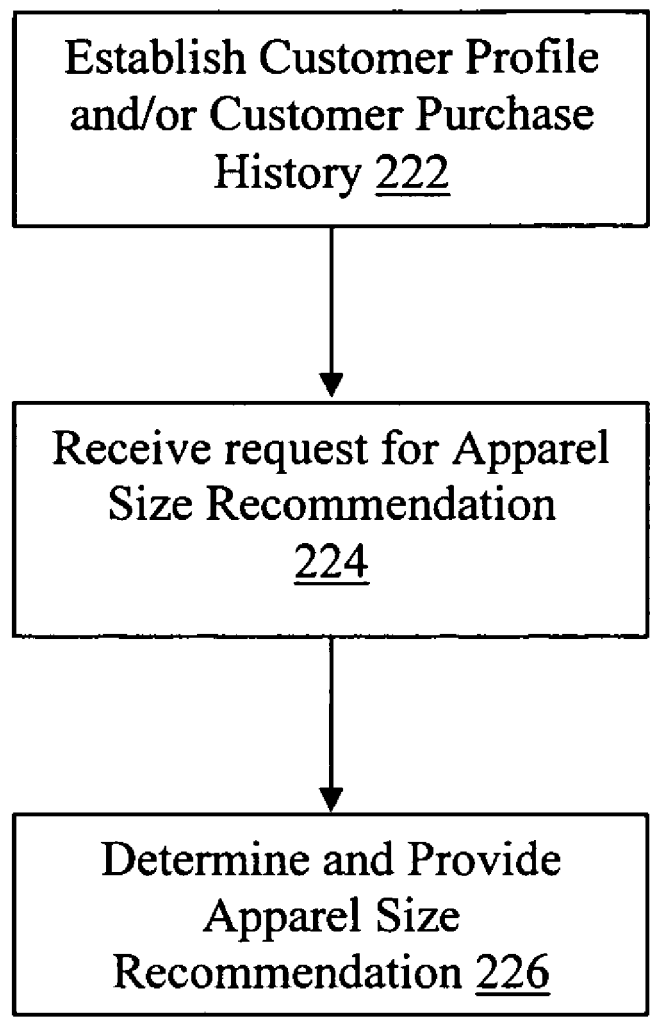
FIGS. 2a-2b illustrate a method of the present invention in accordance with various embodiments, and an example of an undirected graph suitable for use to practice various embodiments of the present invention.
Figure 2B:
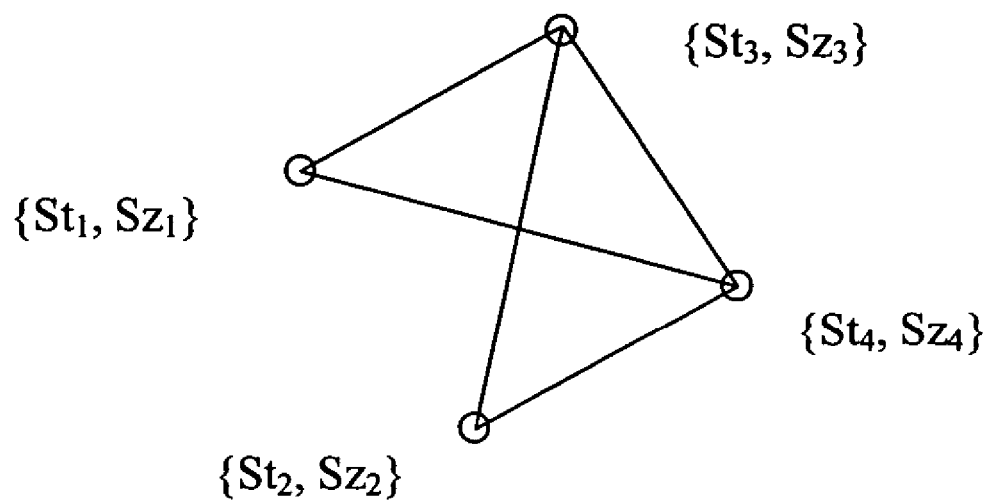

FIGS. 2a-2b illustrate a method of the present invention in accordance with various embodiments, and a data structure suitable for use to implement an apparel size service in accordance with various embodiments of the present invention. More specifically, FIG. 2a illustrates a method 220, and FIG. 2b illustrates an undirected graph G 240 reflecting affinity of styles and sizes. The nodes of G are (style, size) pairs. An edge is added to connect two nodes whenever there are customers who have purchased both pairs (i.e., style S in size x and style T in size y). From the history data, a weight may be computed and attributed to the edge corresponding to the number of such customers.

Thus, during operation, for the embodiments of method 220, a customer profile and/or customer purchase history may be initially established, 222. Thereafter, apparel size recommendation request may be received 224 and serviced 226. In various embodiments of the present invention, the servicing of a request may include traversing a graph having a number of nodes correspondingly representing a number of (style, size) pairs, and edges interconnecting the nodes having affinity with each other. The edges may have affinity scores reflecting the degrees of affinity. The traversal may involve employment of a user's profile and/or purchasing history.

For example, during traversal, given a (style, size) pair ($St_i$, $Sz_i$) and another of the form ($St_j$, $Sz_j$), an apparel size service may look at all the paths in the graph connecting the two pairs, and the weights on the edges along those paths. Based at least on these factors, the apparel size service may compute an affinity score between ($St_i$, $Sz_i$) and ($St_j$, $Sz_j$). The higher the affinity score, the more likely that someone who purchases ($St_i$, $Sz_i$) will purchase ($St_j$, $Sz_j$).

In various embodiments of the present invention, as described earlier, the apparel size service may be adapted to generate the answer/answers based on the affinity score notion to sets of (style, size) pairs, as well as purchasing histories.

For example, given a purchasing history H(A), the affinity of a customer having purchasing history H(A) to (U, z) is the sum of the affinities of each component in H(A) to (U, z), where U and z are style and size. Thus, the apparel size service may use the affinity score to predict the most likely size for a given style given purchasing history H(A).

For example, assuming $St_3$ and $St_4$ of FIG. 2b are the same style $St_3/St_4$, if H(A) includes $(St_1, Sz_1)$ and $(St_2, Sz_2)$, a size recommendation of $(St_3, Sz_3)$ and $(St_4, Sz_4)$ may be returned (with likelihood of correctness) for a query for a size recommendation for style $St_3/St_4$ based on the strength of the affinity associated with the various edges connecting the various (style, size) nodes that are members of H(A) to other related (style, size) nodes.

In alternate embodiments of the present invention, style and size affinity may be based on age, height, weight, and/or other factors, with or without factoring the user's purchase history. For example, in various embodiments, the graph may merely include style-size combinations of purchases made by customers of similar age, height and/or weight.

Figure 3:
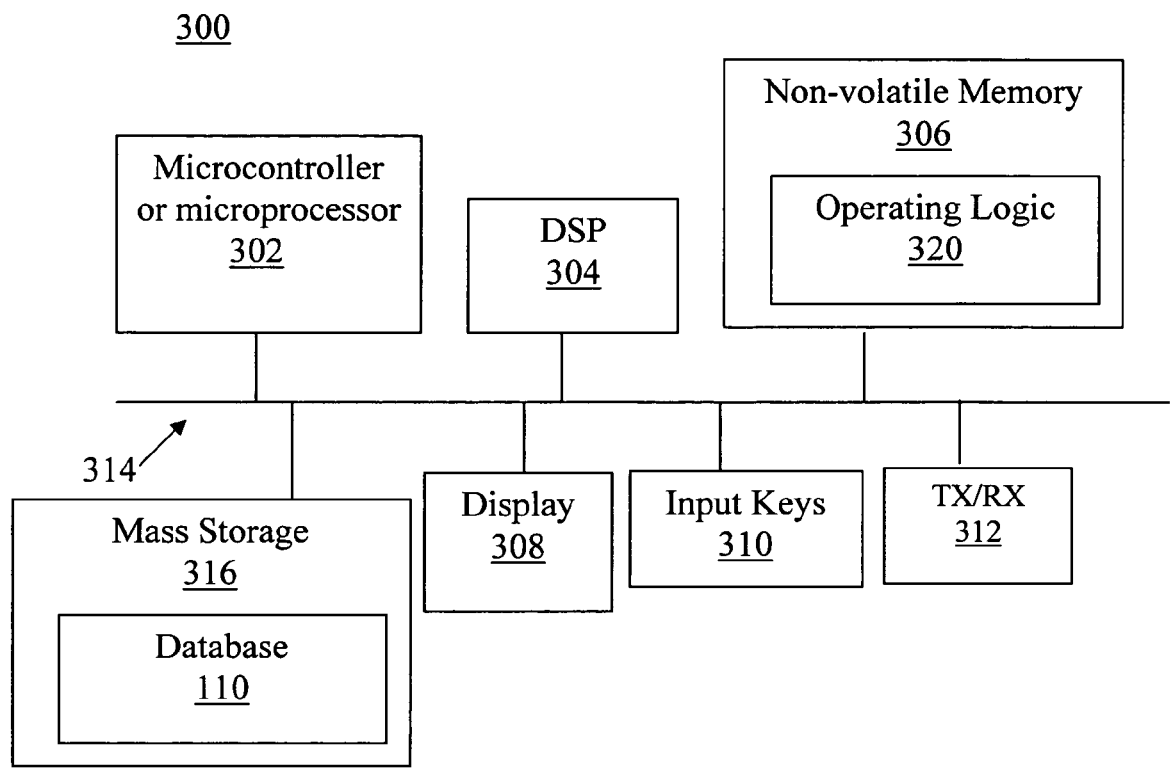
FIG. 3 illustrates a computing environment suitable for use as a client/server of FIG. 1, in accordance with various embodiments of the present invention.

FIG. 3 illustrates an architecture view of a computing device 300, such as a mobile phone, a PDA, a laptop computer, etc., suitable for use as clients 102 (FIG. 1), or a server, suitable for use as server 104 (FIG. 1), in accordance with various embodiments of the present invention. As illustrated in the embodiment of FIG. 3, computing device 300 includes elements found in conventional computing devices, such as microcontroller/microprocessor 302, non-volatile memory 306, display 308, input keys 310 (such as a key pad, select button), and transmit/receive (TX/RX) 312, coupled to each other via bus 314, which may be a single bus or a hierarchy of bridged buses. Further, in the case of a client, computing device 300 may also include digital signal processor (DSP) 304, and non-volatile memory 306 may include operating logic 320 adapted to implement a generic agent, e.g., a web browser. In the case of a server, computing device 300 may include mass storage 316 having database 110, and non-volatile memory 306 may include operating logic 320 adapted to implement an apparel size service in accordance with embodiments of the present invention. The implementation may be via any one of a number of programming languages, assembly, Java, XML, C, C++, C#, and so forth.

Operating logic 320 may include, but is not limited to, logic in support of the earlier described operations of registering a customer/user, storing style-size information in database 110, receiving purchasing history (with style-size) from customer/user and/or e-commerce sites and (graphically) associating them, receiving apparel size requests/queries, and responding to the requests/queries.

Except for their support of the novel apparel size service, the functions and constitutions of the various enumerated elements of FIG. 3 are known in the art, and accordingly will not be otherwise further described either.

In alternate embodiments of the present invention, all or portions of the apparel size service may be implemented in hardware, firmware, or a combination thereof. Hardware implementations may be in the form of application specific integrated circuits (ASIC), reconfigured/reconfigurable circuits (such as Field Programmable Gate Arrays (FPGA)), and so forth.

Referring now back to FIG. 1, in addition to the foregoing embodiments of the present invention, where an apparel size service is implemented as a standalone service, in alternate embodiments, the apparel size service may be implemented as an integral part of an ecommerce service, such as, an ecommerce service server 108. In other embodiments of the present invention, an apparel size service may be implemented as a third party "backend" service to ecommerce services, such as, ecommerce service server 108. In still other embodiments of the present invention, the apparel size service may also be implemented as an enterprise application, servicing all or a region of geographically distributed physical stores. In each of these embodiments, the service may be offered with or without, direct or indirect charges to the customers/users.

Further, in alternate embodiments of the present invention, an apparel size service may also consider relationships between styles for a given designer, or among different designers or brands. For example, if a customer wears a size 4 in brand X, and the apparel size service has information that most people who wear a size 3 in brand X wear a size 3 in brand Y, the apparel size service may predict that the customer will wear a size 4 in brand Y.

In still other embodiments of the present invention, an apparel size service may also use other features, e.g., height, weight, gender, etc., to make better predictions.

Still further, in various embodiments of the present invention, other graphs, such as a bipartite graph of customers and styles, with an edge connecting a customer and style whenever the customer wears that particular style, may be employed instead.

Still further embodiments of the present invention may also be practiced with other data processing techniques, e.g., clustering methods to cluster related customers or styles.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A computer implemented method, comprising:
    receiving by a computing device a request from a user for an apparel size recommendation for a first apparel;
    receiving by the computing device from the user one or more characteristics of the user, said one or more characteristics of the user being at least one of style and size data of a second apparel having a suitable fit for the user;
    comparing by the computing device said one or more characteristics of the user with corresponding characteristics of one or more additional individuals; and
    providing in response to the user by the computing device a size recommendation for the first apparel based at least in part on results of comparing said one or more characteristics of the user with said corresponding characteristics of the one or more additional individuals.

2. The method of claim 1, wherein said providing is further based on profile data of the user.

3. The method of claim 1, wherein said receiving of a request comprises receiving by the computing device a query having style data.

4. The method of claim 1, wherein said providing of a size recommendation comprises providing by the computing device a specific style and size recommendation.

5. The method of claim 1, wherein said providing of a size recommendation comprises providing by the computing device a size recommendation in a range of sizes.

6. The method of claim 1, wherein said providing of a size recommendation comprises providing by the computing device a size recommendation with a likelihood of correctness factor.

7. The method of claim 1, wherein said providing of a size recommendation comprises determining by the computing device an affinity between a first style-size combination and a second style-size combination.

8. The method of claim 7, wherein said determining comprises traversing by the computing device one or more edges of a graph interconnecting first and second nodes of the graph correspondingly representing the first and second style-size combinations.

9. The method of claim 8, wherein the graph comprises a plurality of nodes correspondingly representing style-size combinations of purchases of customers that are similar in age, height and/or weight.

10. The method of claim 7, wherein said providing is further based on purchasing history of the user, and said determining comprises obtaining by the computing device the first style-size combination from the user's purchasing history.

11. The method of claim 7, wherein said determining comprises determining by the computing device an affinity between the first style-size combination and a third style-size combination, and an affinity between the second and third style-size combinations.

12. The method of claim 7, wherein the method further comprises storing by the computing device style-size combinations of customer purchases.

13. The method of claim 1, wherein said comparing further comprises comparing the at least one of style and size data of the second apparel having a suitable fit for the user with a corresponding at least one of style and size data of the second apparel having a suitable fit for the one or more additional individuals, and determining a size recommendation for the first apparel for the user by determining a suitable fit of the first apparel for the one or more additional individuals and providing the determined suitable fit as the size recommendation for the first apparel for the user.

14. The method of claim 1, wherein said one or more characteristics of the user further comprise physical characteristics of the user, wherein said comparing further comprises comparing the user with at least one individual from the one or more additional individuals having corresponding physical characteristics, and determining a size recommendation for the first apparel by determining a suitable fit of the first apparel for the at least one individual from the one or more additional individuals having corresponding physical characteristics and providing the determined suitable fit as the size recommendation for the first apparel for the user.

15. The method of claim 14, wherein said physical characteristics include at least one of height, weight, age and gender.

16. A computer implemented method, comprising:
establishing an apparel purchasing history, a profile of a customer, or establishing both and apparel purchasing history and a profile of a customer in a computing device;
initiating a query of the computing device for an apparel size recommendation for an apparel for the customer; and
providing from the computing device a size recommendation for the apparel for the customer based at least in part on said customer apparel purchasing history and/or profile, wherein providing a size recommendation comprises determining by the computing device an affinity between a first style-size combination and a second style-size combination, and wherein said determining comprises traversing by the computing device one or more edges of a graph interconnecting first and second nodes of the graph correspondingly representing the first and second style-size combinations.

17. The method of claim 16, wherein said establishing of a customer apparel purchasing history, when performed, comprises establishing style-size records of apparel purchases of the customer, and said establishing a profile, when performed, comprises establishing a profile containing at least one of the customer's height, weight, age and gender.

18. The method of claim 16, wherein providing a size recommendation comprises providing a size recommendation in a range of sizes.

19. The method of claim 16, wherein providing a size recommendation comprises providing a size recommendation with a likelihood of correctness factor.

20. The method of claim 16, wherein said establishing comprises establishing the customer's profile, and the graph comprises a plurality of nodes correspondingly representing style-size combinations of purchases of customers that are similar in age, height and/or weight.

21. The method of claim 16, wherein said establishing comprises establishing the customer's apparel purchasing history, and said determining comprises obtaining by the computing device the first style-size combination from the customer's purchasing history.

22. An apparatus, comprising:
a processor; and
an apparel size service operated by the processor, and adapted to enable the apparatus to receive a request for an apparel size recommendation for a first apparel for a user, to receive from the user one or more characteristics of the user, said one or more characteristics of the user being at least one of style and size data of a second apparel having a suitable fit for the user, to compare said one or more characteristics of the user with corresponding characteristics of one or more additional individuals, and to provide in response for the user a size recommendation for the first apparel based at least in part on results of comparing said one or more characteristics of the user with said corresponding characteristics of the one or more additional individuals.

23. The apparatus of claim 22, wherein said processor and apparel size service are disposed on a server, and said apparatus further comprises a client device coupled to the server, and adapted to facilitate a user in transmitting the request to the server.

24. The apparatus of claim 23, wherein said client device is coupled with said server over a private network, a public network, or both a private network and a public network.

25. The apparatus of claim 22, wherein said processor and apparel size service are disposed on a first server, and said apparatus further comprises an ecommerce service server coupled to the first server and adapted to provider apparel ecommerce service to the user, including apparel size recommendation, using the apparel size service of the first server.

26. The apparatus of claim 25, wherein said apparel size service server and said ecommerce service server are the same server.

27. A computer implemented method, comprising:
obtaining or constructing by a computing device a graph having a plurality of nodes correspondingly representing a plurality of style-size combinations of various apparel, with edges interconnecting the nodes representing style-size combinations with affinity to each other; and traversing the graph to generate an apparel size recommendation for a user.

28. The method of claim 27, wherein said obtaining or constructing is based at least in part on profile data of the user.

29. The method of claim 27, wherein said traversing is based at least in part on purchasing history of the user.

30. The method of claim 27, wherein said traversing comprises accumulating affinity scores associated with selected edges.

31. A computer implemented method, comprising:
receiving by a computing device a request from a user for an apparel size recommendation for a first apparel;
receiving by the computing device from the user one or more characteristics of the user;
comparing by the computing device said one or more characteristics of the user with corresponding characteristics of one or more additional individuals; and
providing in response to the user by the computing device a size recommendation for the first apparel based at least in part on results of comparing said one or more characteristics of the user with said corresponding characteristics of the one or more additional individuals, wherein providing a size recommendation further comprises determining by the computing device an affinity between a first style-size combination and a second style-size combination.

32. The method of claim 31, wherein said providing is further based on purchasing history of the user, and said determining comprises obtaining by the computing device the first style-size combination from the user's purchasing history.

33. The method of claim 31, wherein said determining comprises determining by the computing device an affinity between the first style-size combination and a third style-size combination, and an affinity between the second and third style-size combinations.

34. The method of claim 31, wherein the method further comprises storing by the computing device style-size combinations of customer purchases.

* * * * *